United States Patent
Celerier

(10) Patent No.: US 9,957,067 B2
(45) Date of Patent: May 1, 2018

(54) PROPULSION SYSTEM IN TWO MODULES FOR SATELLITE ORBIT CONTROL AND ATTITUDE CONTROL

(71) Applicant: THALES, Neuilly-sur-Seine (FR)

(72) Inventor: Bruno Celerier, Toulouse (FR)

(73) Assignee: THALES, Courbevoie (FR)

( * ) Notice: Subject to any disclaimer, the term of this patent is extended or adjusted under 35 U.S.C. 154(b) by 567 days.

(21) Appl. No.: 14/298,558

(22) Filed: Jun. 6, 2014

(65) Prior Publication Data
US 2014/0361123 A1 Dec. 11, 2014

(30) Foreign Application Priority Data
Jun. 7, 2013 (FR) ...................... 13 01302

(51) Int. Cl.
| | |
|---|---|
| *B64G 1/24* | (2006.01) |
| *B64G 1/26* | (2006.01) |
| *B64G 1/40* | (2006.01) |
| *B64G 1/28* | (2006.01) |
| *B64G 1/10* | (2006.01) |

(52) U.S. Cl.
CPC ............... *B64G 1/242* (2013.01); *B64G 1/26* (2013.01); *B64G 1/283* (2013.01); *B64G 1/40* (2013.01); *B64G 1/1007* (2013.01); *B64G 1/405* (2013.01)

(58) Field of Classification Search
CPC .......... B64G 1/26; B64G 1/283; B64G 1/285; B64G 1/40; B64G 1/401; B64G 1/403; B64G 1/404; B64G 1/405; B64G 1/406
See application file for complete search history.

(56) References Cited

U.S. PATENT DOCUMENTS

| | | | |
|---|---|---|---|
| 3,559,919 A | 2/1971 | Sass | |
| 4,288,051 A | 9/1981 | Goschel | |
| 6,032,904 A * | 3/2000 | Hosick | B64G 1/26 244/169 |
| 6,213,432 B1 | 4/2001 | Koppel | |
| 6,260,805 B1 * | 7/2001 | Yocum, Jr. | B64G 1/26 244/164 |
| 9,387,942 B2 * | 7/2016 | Celerier | B64G 1/401 |
| 2005/0040282 A1 | 2/2005 | Wingo | |
| 2009/0166476 A1 * | 7/2009 | Termini | B64G 1/26 244/158.6 |

FOREIGN PATENT DOCUMENTS

| | | |
|---|---|---|
| EP | 0780299 A1 | 6/1997 |
| EP | 0799768 A1 | 10/1997 |
| FR | 2365154 A1 | 4/1978 |
| NL | 1032158 C2 * | 1/2008 ............... B64G 1/26 |
| WO | 2009076448 A1 | 6/2009 |

* cited by examiner

*Primary Examiner* — Richard R Green
(74) *Attorney, Agent, or Firm* — Baker & Hostetler LLP

(57) ABSTRACT

A propulsion system for the orbit control of a satellite in Earth orbit driven at a rate of displacement along an axis V tangential to the orbit comprises two propulsion modules, fixed to the satellite, and facing one another relative to the plane of the orbit, each of the propulsion modules comprising, in succession: a motorized rotation link about an axis parallel to the axis V; an offset arm; and a plate supporting two thrusters, suitable for delivering a thrust on an axis, arranged on the plate on either side of a plane P at right angles to the axis V passing through a center of mass of the satellite; each of the two thrusters being oriented in such a way that the thrust axes of the two thrusters are parallel to one another and at right angles to the axis V.

16 Claims, 9 Drawing Sheets ized by collision with electrons, creating xenon ions. The thrust is generated when the charged xenon ions are accelerated from the thruster by an electromagnetic field. Although costly and of great initial weight, the effectiveness of the thruster, or its capacity to generate force by mass ejection, also called specific impulsion, is substantially greater than that of chemical thrusters.

PROPULSION SYSTEM IN TWO MODULES FOR SATELLITE ORBIT CONTROL AND ATTITUDE CONTROL

CROSS-REFERENCE TO RELATED APPLICATION

This application claims priority to foreign French patent application No. FR 1301302, filed on Jun. 7, 2013, the disclosure of which is incorporated by reference in its entirety.

FIELD OF THE INVENTION

The present invention relates to the field of satellite orbit control and attitude control systems, and more particularly, to the architecture of the onboard propulsion systems for controlling the orbit of geostationary telecommunications satellites.

BACKGROUND

In order to allow for the use of the various mission instruments of a satellite, such as telecommunication systems, it should be possible to control the position and the orientation of the satellite in orbit. For this, control systems are implemented for maintaining, on the one hand, the orientation of the satellite relative to the Earth, that is to say the attitude control, and, on the other hand, its position in orbit relative to a desired ideal position, that is to say orbit control. For example, in the case of geostationary satellites, orbit control seeks to limit the inclination relative to the equatorial plane, to limit the eccentricity of the orbit, and to limit the drift in the longitudinal position of the satellite relative to Earth. For this, thrusters are positioned at various points on the satellite to correct the trajectory at more or less short intervals by applying a force to the satellite. These station-keeping operations require the availability of a sufficient reserve of fuel throughout the life of the satellite.

A satellite is placed in orbit by the combination of a space launch vehicle and its own propulsion systems. The launch vehicle transports and releases the satellite on a first Earth orbit called transfer orbit, the perigee of which is generally low; once in this first orbit, a propulsion system of the satellite takes over to transport the satellite to its final orbit. Generally, this transfer is performed by means of a main satellite thruster PSP that consumes a chemical fuel of ergol or propergol type, delivering a thrust of high power making it possible to rapidly reach the final orbit.

Once in station, a number of lower power secondary thrusters ensure that the satellite is kept in position in the orbit. For this, ergol chemical thrusters or electrical thrusters can be used. In an electrical thruster, of plasma thruster or ion thruster type, xenon atoms are ionized by collision with electrons, creating xenon ions. The thrust is generated when the charged xenon ions are accelerated from the thruster by an electromagnetic field. Although costly and of great initial weight, the effectiveness of the thruster, or its capacity to generate force by mass ejection, also called specific impulsion, is substantially greater than that of chemical thrusters.

In the known systems chemical thrusters and electrical thrusters are positioned at various points on the structure of the satellite to address all the needs of the mission, from transport from the transfer orbit to keeping in orbit throughout the life of the satellite. The propulsion systems that are thus implemented have the drawback of a high cost and high weight, different thrusters and fuel. These drawbacks limit the payload capacity of the satellite.

According to the known prior art, an orbit control system seeks to control the position of the satellite through six orbital parameters. FIG. 1 represents a geostationary satellite 10 in orbit 11 around the Earth 12. The orbit 11 is inclined by an angle θ relative to the equatorial plane 13 which contains the ideal geostationary orbit 14. The orbit 11 of the satellite intersects the equatorial plane 13 at two points 15 and 16, commonly called orbital nodes. The six orbital parameters used to qualify the position of a satellite are also known: the half major axis, the eccentricity, the inclination, the argument of the ascending node, the argument of the perigee, and the true anomaly. The orbit control consists in quantifying these orbital parameters and performing the necessary operations by means of the onboard propulsion systems, to keep the satellite in a predefined zone around an ideal position. As an example, for a geostationary satellite, a drift window of plus or minus 0.1°, representing a width of almost 150 km, is allocated around a target position.

A routine architecture of a satellite 10, as represented in FIG. 2, comprises a parallelepipedal structure 20 onto which are fastened various devices useful to the piloting of the satellite 10 and to its mission. Telecommunication instruments 21 are installed on a face 22 whose orientation is kept facing the Earth, commonly called Earth face. On an opposite face 23, commonly called anti-Earth face, the main satellite thruster PSP is positioned, notably ensuring the thrust needed for the transfer from low orbit to the final orbit. On two opposing lateral faces 24 and 25, commonly called north face and south face, because of their orientation relative to the equatorial plane, there are positioned two sets of solar panels 26 and 27 making it possible to supply electrical energy to the onboard systems. Various devices can be installed on the lateral faces 28 and 29, commonly called east face and west face for their orientation relative to a Earth longitude. Maintaining a constant orientation of the satellite relative to the Earth is necessary to the successful completion of the mission of the satellite, for example for the orientation of the solar panels 26 and 27 or the pointing of the telecommunication systems 21 towards the Earth. This is done by means of an attitude control system. A number of attitude control systems are known that are suitable for detecting and correcting the orientation errors. Thus, the orientation of the satellite can be measured by means of a sensor assembly, comprising, for example, a sensor directed towards the Earth, positioned on the Earth face, for a measurement on two axes pitch and roll, relative to the Earth and a set 30 of gyroscopes to detect speeds of rotation on three axes. From these measurements, satellite orientation corrections about the center of gravity of the satellite can be made, for example by means of a set of inertia wheels 31 or gyroscopic actuators.

A satellite equipped with such a system allowing for attitude control is said to be stabilized on three axes. Typically, by controlling the speed of rotation and the orientation of the inertia wheels, it is possible to correct an orientation error within a reference trihedron linked to the satellite. Hereinbelow, Z designates an axis directed towards the Earth, also called yaw axis, Y an axis at right angles to the orbit and oriented in the direction opposite to the kinetic moment of the orbit (towards the south for a geostationary orbit), also called pitch axis, and X an axis forming, with Y and Z, a direct orthogonal reference frame, also called roll axis, which is oriented according to the speed in the case of circular orbits.

For the orbit control, a number of thrusters are arranged on the structure 20 of the satellite 10. A first high power thruster PSP, making it possible to ensure the transfer between the initial Earth orbit (after release from the launch vehicle) and the final orbit, is positioned on the anti-Earth face 23. According to a known prior art, a first set of thrusters, comprising, for example, two thrusters 32 and 33 positioned on the north face and on the south face in proximity to the anti-Earth face, is used to control the inclination. A second set of thrusters, such as, for example, the thrusters 34 and 35, positioned on the east and west faces, is used to control the eccentricity and the drift. It is also known that controlling the inclination takes around five to ten times more fuel than controlling the eccentricity and drift. For this reason, the inclination control is generally performed by means of a plasma thruster, which consumes less fuel, whereas the thrusters dedicated to controlling the eccentricity and drift are more often than not chemical ergol thrusters.

As an example, a regular satellite with a dry weight of 2500 kg and accommodating a payload of 900 kg comprises a main thruster, two plasma thrusters for the inclination and eccentricity, and four ergol thrusters for the eccentricity and drift. Typically, 1700 kg of ergol are needed for the initial orbit transfer, and 220 kg of xenon are needed to ensure the orbit control of the satellite for a mission duration of approximately 15 years. Thus, the cost and the weight of the current propulsion systems limit the capacity to have a high payload onboard. It can also be noted that, in most known propulsion systems for controlling orbit, the various onboard thrusters in reality comprise two propulsive engines positioned side by side, for mission safety and reliability reasons. This redundancy, well known to those skilled in the art, is not represented in the figures but it is considered hereinbelow that a thruster may consist of one or more propulsive engines forming a propulsive set, and of which the thrust which can be delivered is identical, in orientation or in intensity.

FIGS. 3a, 3b and 3c illustrate the principle of orbit control for a satellite according to the known prior art. The structure 20 of the satellite 10 is represented by a side view, the east face being visible. The thruster 32 is linked to the north face of the structure 20 by means of a two-axis mechanism 40. The two-axis mechanism 40 allows the rotation of the thruster 32 relative to the structure 20 on a first axis parallel to the axis Y and a second axis parallel to the axis X. In FIGS. 3a to 3c, the two-axis mechanism 40 is a universal joint link produced by means of a first pivot link 41 of axis parallel to the axis Y and a second pivot link 42 of axis parallel to the axis X. The centre of mass of the satellite, situated inside the parallelepipedal structure 20, is referenced CM.

In FIG. 3a, the orientation of the thruster 32 makes it possible to direct the thrust of the thruster towards the centre of mass CM of the satellite. To perform an inclination correction manoeuvre, a technique known to those skilled in the art consists in firing the thruster 32 a first time in proximity to an orbital node, for example 15, then the thruster on the opposite side a second time in proximity to the opposite orbital node, 16 in the example. Thus, the thrust from the first firing of the thruster 32, oriented towards the centre of mass CM, displaces the satellite in a direction that has a Z component and a Y component. Twelve hours later, the thrust of the second firing at the opposite orbital node displaces the satellite in a direction having a Z component opposite the first firing, and which compensates the undesired effect on the eccentricity and a Y component, also opposite, but the desired inclination effects of which accumulate. Thus, two firings of equal intensity are performed at twelve hour intervals in proximity to the orbital nodes 15 and 16 make it possible to cancel the effect of the radial component to retain only a north-south correction. This known procedure allows for a daily correction of the inclination.

By this same technique, it is also possible, by applying a second thrust of intensity different from the first, to apply eccentricity corrections on an axis at right angles to the line joining the two orbital nodes 15 and 16. Techniques have also been developed to allow for eccentricity corrections on a second axis, by offsetting the firing of the thruster relative to the orbital node, but at the cost of less effective control of the inclination. To sum up, the known systems make it possible, by means of two thruster systems 32 and 33, to ensure the control of the inclination and the control of the eccentricity on an axis with no loss of optimization of the inclination control, or to ensure the control of the inclination and the control of the eccentricity on two axes with a loss of optimization of the inclination control. The drift control can be handled by these two thrusters. A regular satellite comprises, for this, four chemical ergol nozzles positioned on the east and west faces of the satellite.

The thruster systems 32 and 33 are also useful for managing the quantity of movement of the attitude control systems, as illustrated in FIGS. 3b and 3c. By applying a thrust off the centre of mass CM—in a plane Y-Z in FIG. 3b and off the plane Y-Z in FIG. 3c, a rotation torque is generated on the satellite—a role torque in FIG. 3b and a pitch and yaw torque in FIG. 3c. These two torques can be used to load or unload the inertia wheels along two axes. For example, when the speed of rotation of an inertia wheel reaches it limit speed, effort will be made to orient the thrust deliberately off the centre of mass CM so as to generate, in addition to the desired displacement of the satellite, a torque making it possible to desaturate the inertia wheel, or more generally, the problem will be anticipated by reducing the kinetic moment to desired values at the time of each manoeuvre. These desired values obviously possibly being zero, but also a value shrewdly defined in such a way as to anticipate the trend of the kinetic moment between two manoeuvres under the effect notably of the solar radiation pressure.

Note also that the centre of mass of the satellite varies during the life of the satellite, notably because of the gradual consumption of the onboard fuel. In the known systems, algorithms are implemented for the combined management of the attitude control and of the orbit control, and to make it possible to take account of the position of the centre of mass CM throughout the life of the satellite.

The issue of being able to have effective propulsion systems will therefore be understood. The current solutions, which implement thrusters of different kinds of different locations on the satellite are relatively complex, costly and exhibit a high weight which limits the onboard capacity of the satellite.

SUMMARY OF THE INVENTION

The invention aims to propose an alternative solution for controlling the orbit and producing the torques to be exerted on the satellite during the manoeuvres while mitigating the implementation difficulties cited above.

To this end, the subject of the invention is a propulsion system for the orbit control of a satellite in Earth orbit driven at a rate of displacement along an axis V tangential to the orbit, characterized in that it comprises two propulsion modules, fixed to the satellite, and facing one another relative to the plane of the orbit, each of the propulsion modules comprising, in succession:

a motorized rotation link about an axis parallel to the axis V, an offset arm, and a plate supporting two thrusters, suitable for delivering a thrust on an axis, arranged on the plate on either side of a plane P at right angles to the axis V passing through a centre of mass (CM) of the satellite; each of the two thrusters being oriented in such a way that the thrust axes of the two thrusters are parallel to one another and at right angles to the axis V.

Advantageously, the two thrusters of each of the propulsion modules are arranged on the plate substantially at equal distances from the plane P.

Advantageously, each of the two main thrusters of each of the two propulsion modules comprises a redundant thruster arranged on the plate in proximity to said main thruster, and in such a way that its thrust axis is contained in a plane parallel to the plane P and containing the thrust axis of said main thruster.

Advantageously, each of the two main thrusters of each of the two propulsion modules comprises a redundant thruster arranged on the plate in proximity to said main thruster, and in such a way that its thrust axis is contained in a plane containing the thrust axes of the two main thrusters.

Advantageously, the motorized link of each of the two propulsion modules allows the rotation of the plate between:

a storage position, suitable for the launching of the satellite; the offset arm of said propulsion module being held against the satellite, and an operational position, configured in such a way that the plane containing the thrust axes of the two thrusters of said propulsion module passes in proximity to the centre of mass CM of the satellite.

Advantageously, each of the two propulsion modules also comprises, between the offset arm and the plate of said propulsion module, a second motorized rotation link about an axis T at right angles to both the axis V and the thrust axes of the two thrusters of said propulsion module.

Advantageously, each of the two propulsion modules also comprises, between the second motorized link and the plate, a second offset arm.

The invention relates also to a satellite in Earth orbit provided with a propulsion system having the features described previously.

The invention relates also to a method for controlling the inclination of a satellite in geostationary orbit comprising a propulsion system having the features described previously, and comprising steps consisting in:

displacing a first propulsion module, by means of its motorized link, in such a way that the plane containing the thrust axes of its two thrusters passes in proximity to the centre of mass CM of the satellite, simultaneously activating the two thrusters of said first module in proximity to a first orbital node, displacing the second opposite propulsion module, by means of its motorized link, in such a way that the plane containing the thrust axes of its two thrusters passes in proximity to the centre of mass of the satellite, simultaneously activating the two thrusters of said second module in proximity to a second orbital node, opposite the first orbital node.

The invention relates also to a method for transferring the orbit of a satellite comprising a propulsion system having the features described previously, and comprising steps consisting in:

for each of the two propulsion modules, orienting the thrusters, by means of the motorized link, in such a way that the plane containing the thrust axes of the thrusters is parallel to the plane of the orbit, simultaneously activating the thrusters of the two propulsion modules.

The invention relates also to a method for controlling the kinetic moment of a satellite comprising a kinetic moment accumulation device and a propulsion system, characterized in that it comprises steps consisting in:

orienting the thrusters (54a, 54b) of the two propulsion modules (50a, 50b) of at least one propulsion assembly (100) by means of their motorized link (51a) in one and the same angular position, simultaneously activating the two duly oriented thrusters (54a, 54b), so as to generate, on the satellite, a torque about the axis V.

The invention relates also to a method for controlling the kinetic moment of a satellite comprising a kinetic moment accumulation device and a propulsion system having the features described previously, and comprising steps consisting in:

orienting the thrusters of at least one propulsion module by means of the motorized link of said module, activating the two thrusters of said module differentially, in intensity or in duration, so as to generate a torque on the satellite, the torque thus generated about the axis at right angles to both the axis V and the two thrust axes of the two thrusters being able to limit or reduce the kinetic moment absorbed by the kinetic moment accumulation device of the satellite.

The invention relates also to a method for controlling the kinetic moment of a satellite comprising a kinetic moment accumulation device and a propulsion system, characterized in that it comprises steps consisting in:

orienting the thrusters (54a, 55a) of at least one propulsion module (50a) by means of the motorized link (51a) and/or (70a) of said propulsion module (50a), activating the two thrusters (54a, 55a) of said propulsion module (50a) differentially, in intensity or in duration, so as to generate, on the satellite (10), a torque about the axis at right angles to both the axis V and the two thrust axes of the two thrusters (54a, 55a), the duly generated torque limiting or reducing the kinetic moment absorbed by the kinetic moment accumulation device of the satellite (10), and the force on the axis X contributing to controlling the movement of the satellite in the plane of its orbit.

BRIEF DESCRIPTION OF THE DRAWINGS

The invention will be better understood and other advantages will become apparent on reading the detailed description of embodiments given by way of example in the following figures.

In the interests of clarity, the same elements will bear the same references in the different figures.

DETAILED DESCRIPTION

Figure 4A:
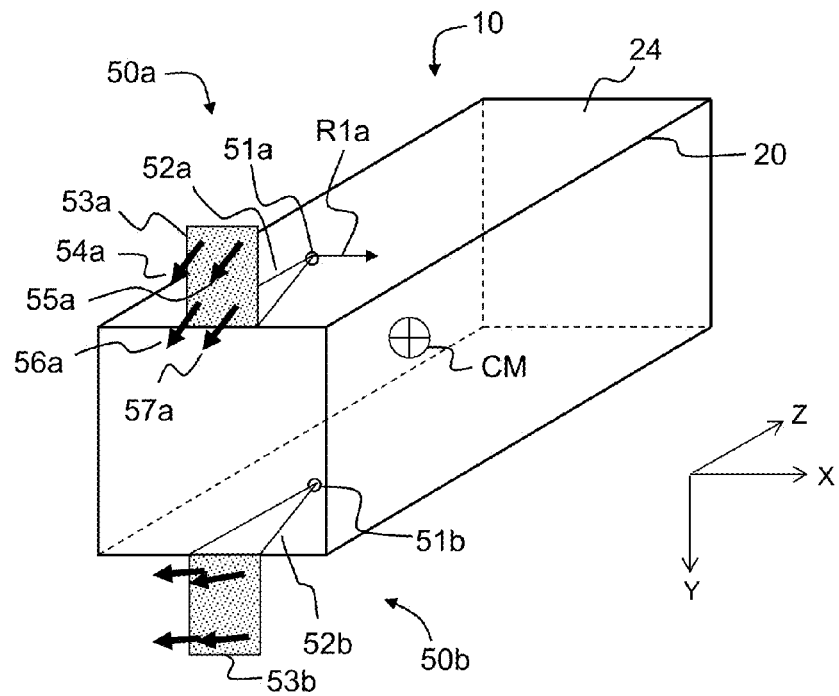
FIGS. 4a, 4b and 4c represent a first embodiment of the propulsion system respectively in storage position, in orbit transfer position and in operational position.
Figure 4B:
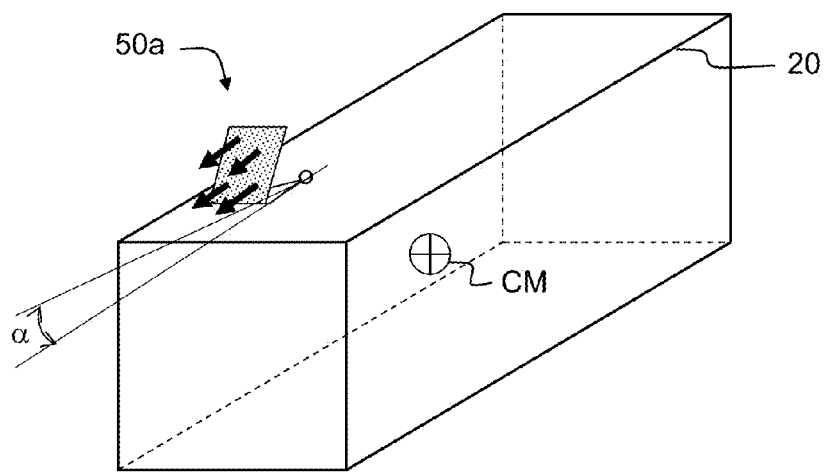
Figure 4C:
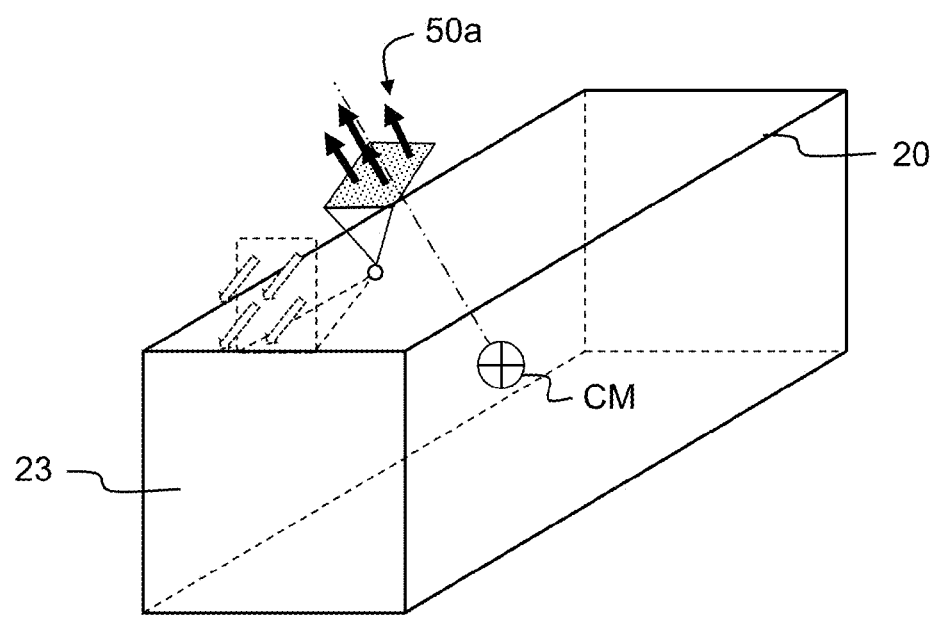

FIGS. 4a, 4b and 4c represent a first embodiment of the propulsion system respectively in storage position, in orbit transfer position and in operational position. As previously described, a satellite 10 in orbit 11 is stabilized on three axes of a reference trihedron linked to the satellite by means of an attitude control system. The reference trihedron comprises an axis Z oriented towards the Earth, an axis Y at right angles to the orbit and oriented in the direction opposite to the kinetic moment of the orbital rotation, and an axis X forming, with the axes Y and Z, a direct orthogonal reference frame. The axis X is oriented in the direction of the speed of the satellite in orbit 11 around the Earth 12. The satellite 10 comprises a parallelepipedal structure 20 with two faces 22 and 23, called Earth face and anti-Earth face, that are at right angles to the axis Z and oriented respectively towards the Earth and towards a direction opposite the Earth, and two opposite adjacent faces 24 and 25, called north face and south face, that are at right angles to the axis Y and oriented respectively towards the north and the south in the Earth's magnetic field. There is also a centre of mass CM of the satellite, the position of which varies slightly during the life of the satellite, and is situated inside the structure 20.

For reasons of clarity, the description of the invention is based on the reference frame formed by the axes X, Y and Z and on a satellite with a structure 20 that is parallelepipedal. The invention is in no way limited to a satellite with a parallelepipedal structure 20, nor to a satellite stabilized on the three axes X, Y and Z. It extends generally to any satellite 10 in Earth orbit 11 having a kinetic moment accumulation capacity, driven by a speed of displacement tangential to the Earth orbit 11. Hereinbelow, the axis of the speed is referenced axis V; it is merged with the axis X in the particular case represented in the figures of a satellite in circular orbit.

In the first embodiment described by FIGS. 4a, 4b and 4c, the propulsion system comprises two propulsion modules 50a and 50b fixed to the satellite 10, and arranged facing one another relative to the plane of the orbit 11. In the case of a satellite comprising a parallelepipedal structure 20 as represented in the figures, the propulsion modules 50a and 50b are fixed to the satellite 10 respectively via the north 24 and the south 25 faces.

The two propulsion modules 50a and 50b have an identical architecture. The propulsion module 50a fixed on the north face comprises, in succession:

a motorized link 51a for rotation about an axis R1a parallel to the axis V, an offset arm 52a, and a plate 53a supporting two thrusters 54a and 55a, suitable for delivering a thrust on a specific axis, schematically represented by an arrow in the figures. The two thrusters 54a and 55a are arranged on the plate 53a on either side of a plane P at right angles to the axis V passing through the center of the mass CM of the satellite. Each of the two thrusters 54a and 55a is oriented in such a way that the thrust axes of the two thrusters, schematically represented by the arrows in the figures, are parallel to one another and at right angles to the axis V.

In this first embodiment, each of the two main thrusters 54a and 55a comprises a redundant thruster, respectively 56a and 57a, arranged on the plate 53a in proximity to said main thruster, respectively 54a and 55a, and in such a way that its thrust axis is contained in a plane parallel to the plane P and containing the thrust axis of said main thruster, respectively 54a and 55a. In the case of a satellite with circular orbit referenced by means of the reference trihedron (X, Y, Z), this means that the thrust axes of the four thrusters (two main thrusters and two redundant thrusters) are parallel to one another and at right angles to the axis X; each main thruster/redundant thruster pair being aligned on the axis Y.

Similarly, the opposite propulsion module 50b, fixed on the south face, comprises a motorized link 51b for rotation about an axis parallel to the axis V, an offset arm 52b, and a plate 53b supporting two thrusters, suitable for delivering a thrust on a specific axis. The two thrusters are arranged on the plate 53b on either side of a plane P at right angles to the axis V passing through the centre of mass CM of the satellite. Each of the two thrusters is oriented in such a way that the thrust axes of the two thrusters are parallel to one another and at right angles to the axis V.

As for the first propulsion module 50a, each of the two thrusters of the propulsion module 50b comprises a redundant thruster, arranged on the plate 53b according to the same geometrical constraints at the first module 50a.

For each of the propulsion modules (e.g. 50a), it is advantageous to have the two thrusters (i.e. 54a and 54b) on the plate (i.e. 53a) at equal distances from the plane of the orbit. It is also advantageous, for each of the propulsion modules (e.g. 50a), to have the two thrusters (i.e. 54a and 54b) on the plate (i.e. 53a) at equal distances from the plane P defined previously.

FIG. 4a represents the propulsion modules, respectively 50a and 50b, in a storage position suitable for the launching of the satellite. In this position, the offset arms, respectively 53a and 53b, of the propulsion modules are held against the satellite, respectively against the north and south faces of the structure of the satellite.

FIG. 4b represents the propulsion module 50a in an intermediate position suitable for the orbit transfer. In this position, the offset arm 52a is displaced by means of the motorized link 51a so as to form an angle α with the axis Z; this angle α being defined in such a way that the thrust axes of the thrusters are parallel to the axis Z. When the two propulsion modules are in this intermediate position, the simultaneous firing of the thrusters of the two propulsion modules generates a resultant thrust aligned on the axis Z, and with balanced torque. Thus, it is envisaged that the propulsion system will be used, by simultaneous firing of the main thrusters and/or redundant thrusters of the two modules, to implement the orbit transfer, either in addition to the PSP thruster or instead of this PSP thruster. Note, too, that it is envisaged that the thrusters will be arranged on the plate in such a way that, in the storage position, the thrust axes of the thrusters are parallel to the axis Z. In this case, the storage position is suited to the orbit transfer without requiring the displacement of the propulsion module.

FIG. 4c represents the propulsion module 50a in an operational position suited to orbit control. In this position, the offset arm 52a and the plate 53a are displaced by means of the motorized link 51a in such a way that the plane containing the thrust axes of the thrusters of the module 50a passes in proximity to the centre of mass CM of the satellite.

Thus, the simultaneous firing of the two thrusters 54a and 55a of the propulsion module 50a, results in a thrust on the centre of mass CM, with a significant component on the axis Y. One benefit of the present invention for inclination control in the case where the centre of mass CM of the satellite is remote from the anti-Earth face 23 will be understood here. In practice, the known systems which have thrusters in proximity to the anti-Earth face generate a thrust having only a weak component on the axis Y. The result of this is a low inclination control efficiency. The propulsion modules according to the invention make it possible, by the displacement of the thrusters offset on the plate, and by means of the motorized link 51a fixed at a distance from the anti-Earth face, to generate a thrust that has a significantly greater component on the axis Y. The result of this is a better inclination control efficiency, the quantity of fuel consumed unnecessarily for the component on the axis X being reduced.

Advantageously, the propulsion system also makes it possible to control the torque about two axes. Typically, a differential firing, in intensity or in duration, of the two thrusters 54a and 55a oriented towards the centre of mass, generate, in addition to the satellite speed increment, a hitch and yaw torque. Similarly, the simultaneous firing of the two thrusters oriented slightly off the centre of mass CM, generate, in addition to the satellite speed increment, a roll torque about the axis X.

Figure 5A:
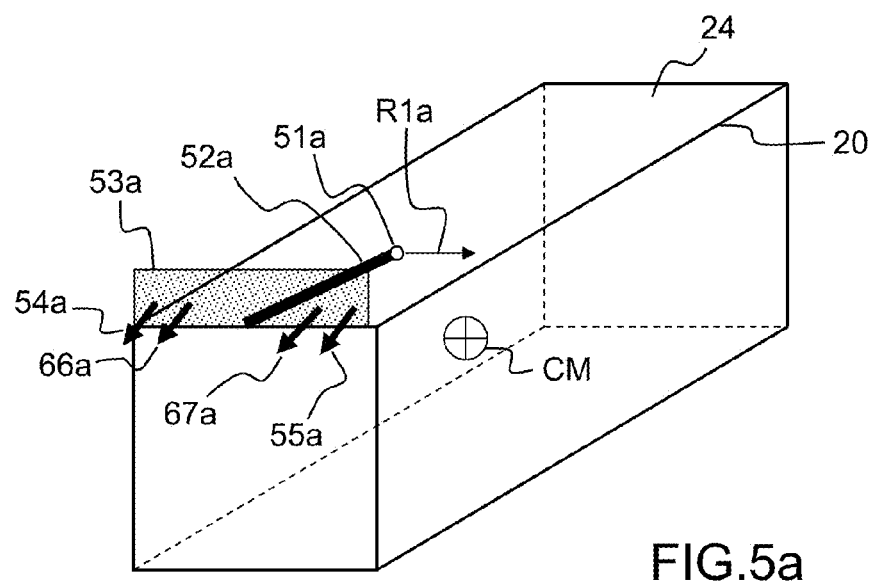
FIGS. 5a and 5b represent a second embodiment of the propulsion system respectively in storage position and in operational position.
Figure 5B:
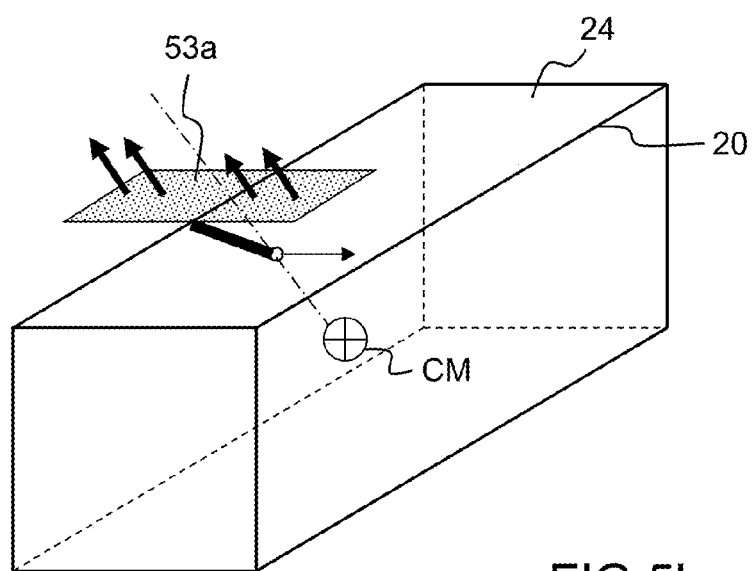

FIGS. 5a and 5b represent a second embodiment of the propulsion system respectively in storage position and in operational position. This second embodiment is differentiated from the first embodiment by the arrangement of the two redundant thrusters associated with the two main thrusters of each of the propulsion modules.

The propulsion system therefore comprises two propulsion modules (only one is represented in FIGS. 5a and 5b). Each propulsion module comprises a motorized link 51a, an offset arm 52a and a plate 53a supporting two main thrusters 54a and 55a represented in FIG. 5a. The characteristics of these components are identical to those of the first embodiment and are not repeated in detail here.

In this second embodiment, each of the two thrusters, respectively 54a and 55a, comprises a redundant thruster, respectively 66a and 67a, arranged on the plate in proximity to said main thruster, respectively 54a and 55a, and in such a way that its thrust axis is contained in a plane containing the thrust axes of the two main thrusters 54a and 55a.

Provision is made for the possibility of not having them arranged strictly parallel so as to best accommodate the interactions of the jet of the thrusters with the other components of the satellite—notably its appendages—or any other constraint of configuration or of optimization of the management of the kinetic moment via the torques generated.

In the case of a satellite with circular orbit referenced by means of the reference trihedron (X, Y, Z) represented in the figures, this means that the thrust axes of the four thrusters (two main thrusters and two redundant thrusters) are parallel to one another and at right angles to the axis X; the two redundant thrusters 66a and 67a being arranged at equal distances from the plane P, and between the two main thrusters 54a and 55a.

Figure 1:
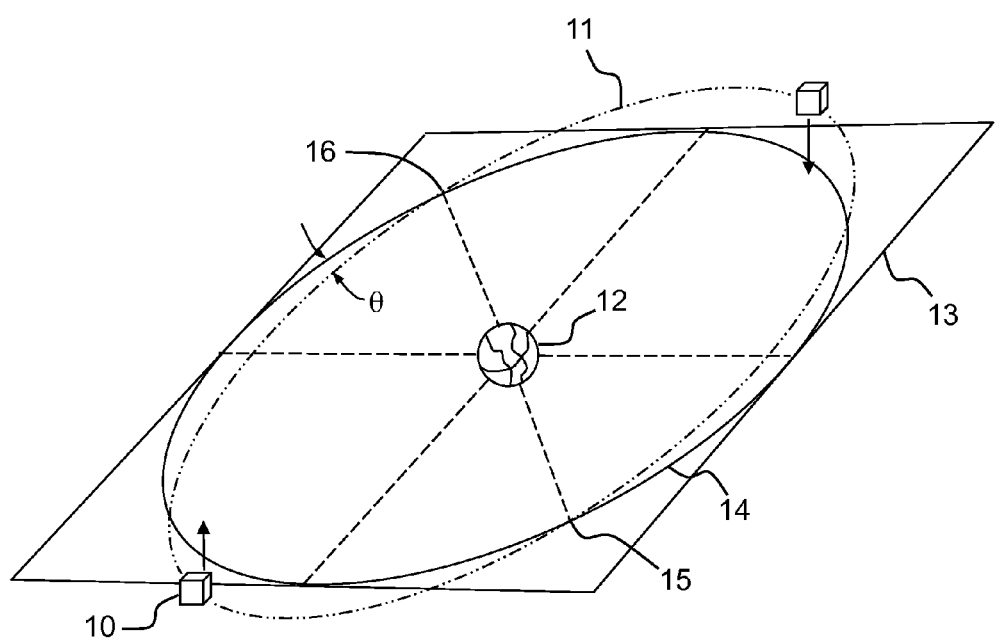
FIG. 1, already presented, represents a geostationary satellite in orbit around the Earth, FIG. 2, already presented, represents a regular architecture of a satellite comprising a structure on which are fixed various devices useful to the piloting of the satellite and to its mission, FIGS. 3a, 3b and 3c, already presented, illustrate the principle of orbit control for a satellite according to the known prior art.
Figure 2:
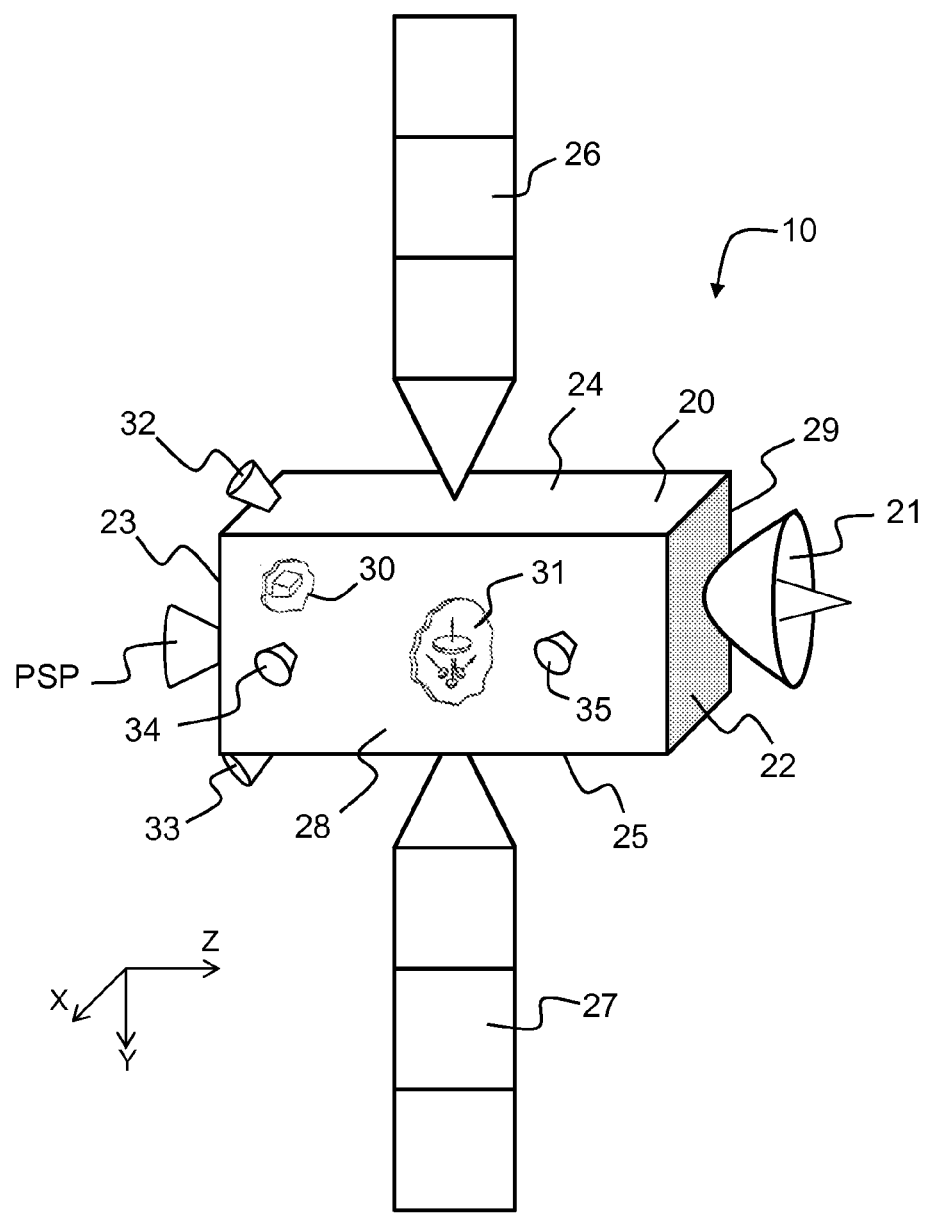
Figure 3A:
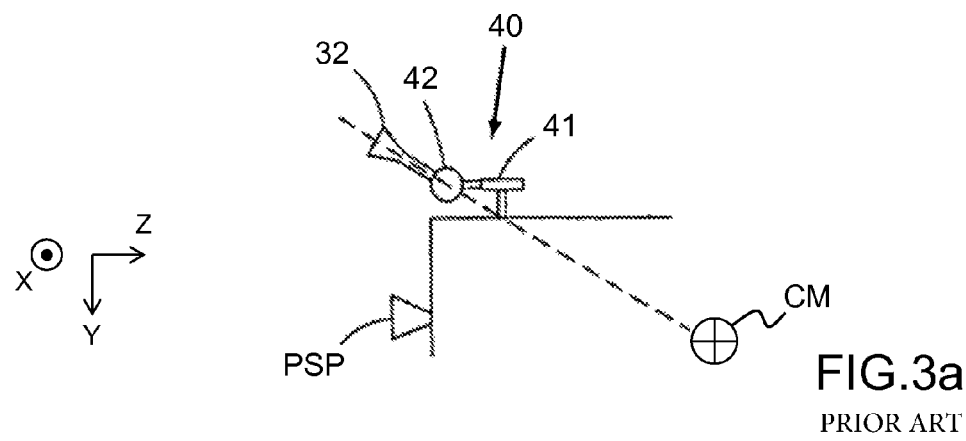
Figure 3B:
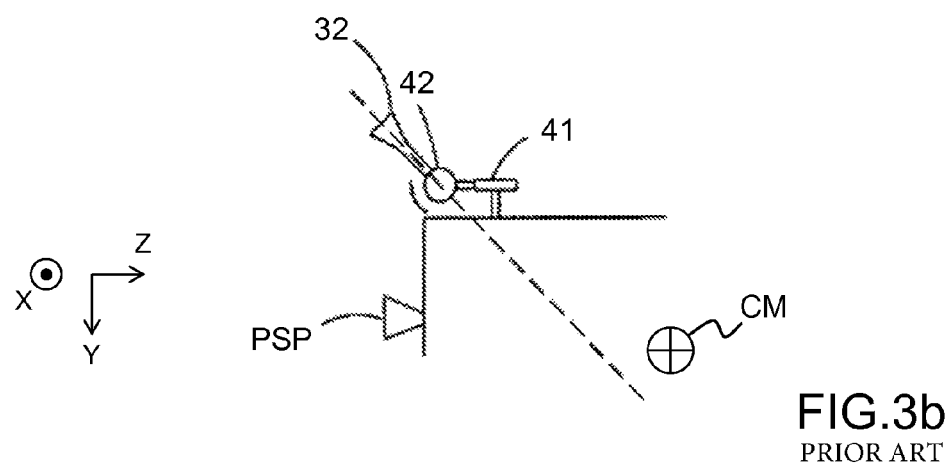
Figure 3C:
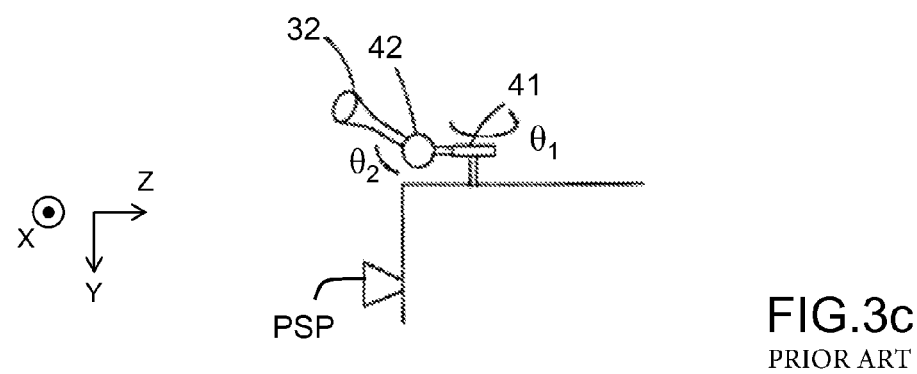

These first two embodiments represented in FIGS. 4a, 4b, 4c, 5a and 5c are particularly advantageous. A gain in inclination control efficiency thereof has been particularly stressed. Also, they simplify the prior art solutions by limiting the propulsion module to one rotational link, compared to two in the prior art represented by FIGS. 3a, 3b and 3c. For this, each propulsion module comprises two thrusters (four thrusters with the redundancy), compared to one thruster in the prior art (two thrusters with the redundancy). In addition to the simplification of the motorized mechanism, the addition of thrusters makes it possible to have a greater overall force. This greater impulse is a significant advantage in the orbit transfer phase. For each propulsion module, four thrusters can be fired simultaneously.

Figure 6A:
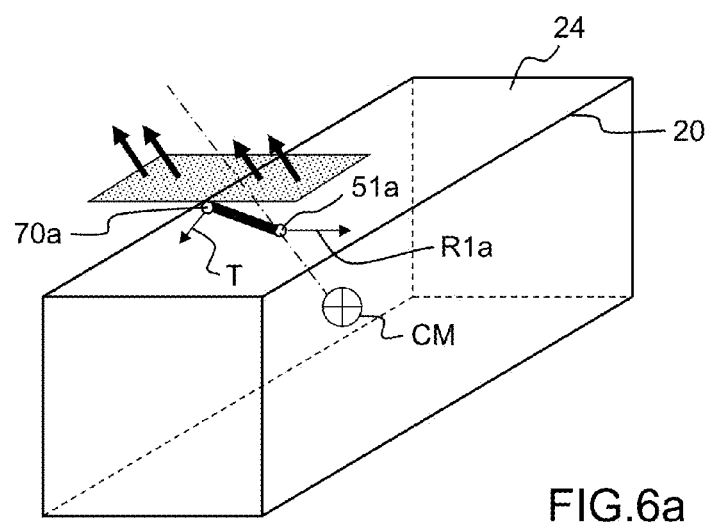
FIGS. 6a, 6b and 6c represent a third embodiment of the propulsion system.
Figure 6B:
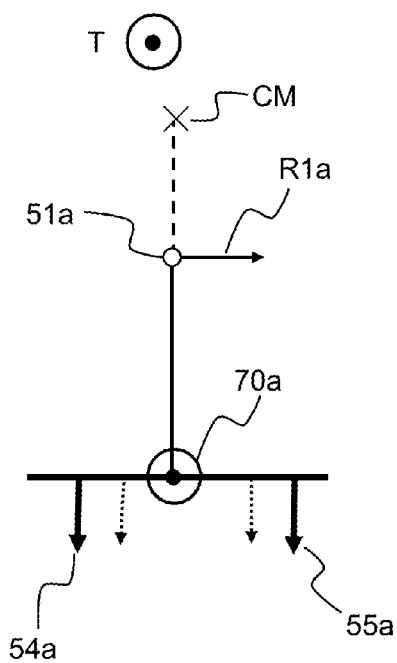
Figure 6C:
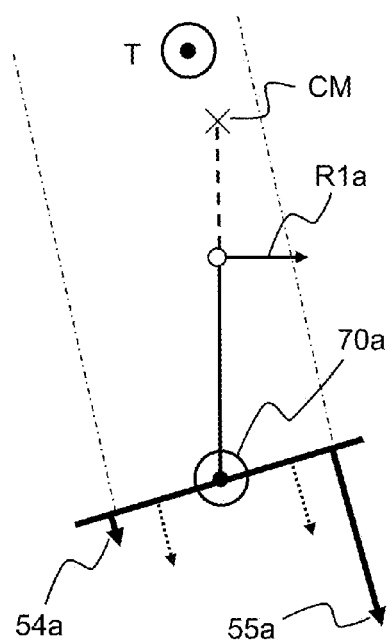

FIGS. 6a, 6b and 6c represent a third embodiment of the propulsion system. This embodiment adds a degree of freedom in rotation to the propulsion module described previously. In FIGS. 6a, 6b and 6c, the propulsion module has an architecture similar to that of the second embodiment, it comprises four thrusters aligned on the axis X. The same references designate the same components. This representation is not limiting on the third embodiment according to the invention. According to the same principle, the addition of the degree of freedom in rotation to a propulsion module is of course envisaged, and has an architecture similar to that of the first embodiment, i.e. when the thrusters are arranged in a square or in a rectangle instead of being aligned.

Thus, the propulsion system according to this third embodiment comprises, for each of the two propulsion modules, between the offset arm 52a and the plate 53a of said module 50a, a second motorized rotation link 70a about an axis T at right angles to both the axis V and the thrust axes of the two thrusters 54a and 55a of said propulsion module 50a.

FIG. 6a represents the propulsion module in operational position. The plane containing the thrust axes of the thrusters passes through the centre of mass CM of the satellite. The second motorized link 70a is in a centered position; the thrust axes of the thrusters being aligned on the axis Z. This is also the position of the propulsion module represented in FIG. 6b. In this view, the propulsion module is presented in the plane containing the thrust axes of the thrusters. This plane is at right angles to the axis T of rotation of the second motorized link 70a, it contains the axis R1a of the first motorized link 51a. In this centred position of the second motorized link, the behaviour of the propulsion module is identical to that described for the second embodiment of the invention. Typically, the simultaneous firing of the two thrusters aligned on the centre of mass allows for a speed increment exhibiting a significant component on the axis Y. The simultaneous firing of the thrusters slightly offset relative to the centre of mass makes it possible to generate a torque on X in addition to the speed increment; the differential firing of the thrusters making it possible to additionally generate a torque on the axis T.

FIG. 6c represents the propulsion module according to the same view in the plane containing the thrust axes of the thrusters, but here the plate and the thrusters have been offset by rotation about the axis T, by means of the second motorized link 70a. In this position, the simultaneous firing of the thrusters 54a and 55a makes it possible to generate a force exhibiting a component on the axis of the speed, in addition to its other components. Similarly, by adjusting a differential firing of the two thrusters 54a and 55a, in intensity or in duration, it is possible to retain this force component on the axis of the speed while controlling the torque generated about the axis T. The benefit of this configuration will be understood here. The addition of the second motorized link, offering a new degree of freedom in rotation about T, allows for the orbit control on the axis of the speed, in other words east-west station-keeping.

Figure 7A:
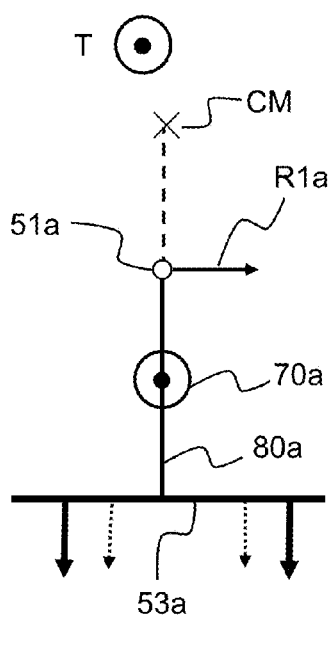
FIGS. 7a and 7b represent a fourth embodiment of the propulsion system.
Figure 7B:
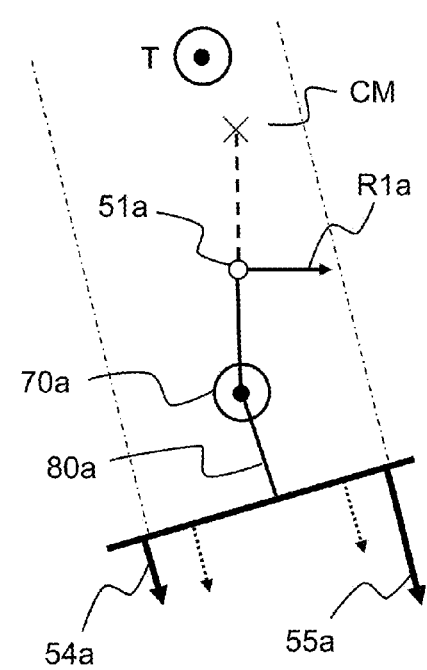

FIGS. 7a and 7b represent a fourth embodiment of the propulsion system. The propulsion system according to this embodiment is differentiated from the preceding one by the addition, for each of the propulsion modules, of a second offset arm 80a, between the second motorized link 70a and the plate 53a. Just like the preceding embodiment, the degree of freedom in rotation about T allows for the orbit control on the axis of the speed. The benefit of this variant is that it limits the imbalance in the thrusts from the differential firing. The more distant the second motorized link is from the plate, the lower the imbalance between the thrusts of the thrusters has to be to generate a force with a component on the axis V while limiting the torque about T.

Figure 8A:
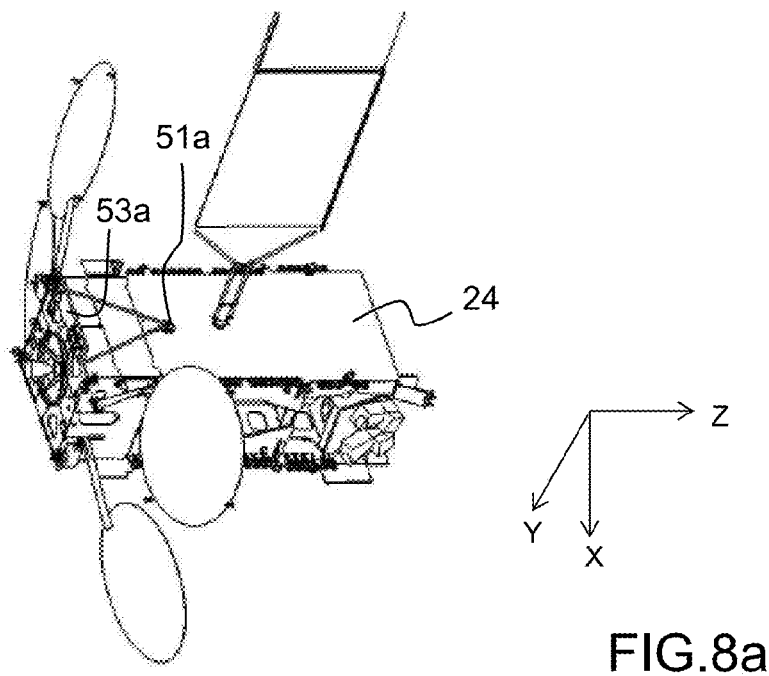
FIGS. 8a and 8b illustrate, by a more detailed view, the second embodiment of the propulsion system respectively in storage position and in operational position.
Figure 8B:
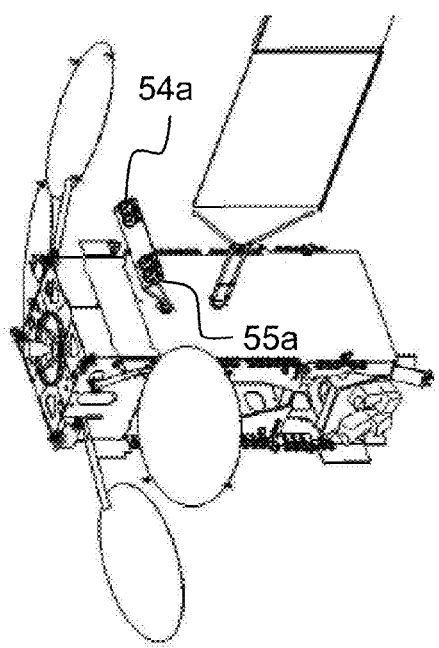

FIGS. 8a and 8b illustrate, by a more detailed view, the second embodiment of the propulsion system respectively in storage position and in operational position. These two views show the architecture of the propulsion system described by FIGS. 5a and 5b, and in particular the motorized link 51a, the plate 53a, the two main thrusters 54a and 55a, and the two redundant thrusters. The offset arm is here formed by two branches forming a fork linking the motorized link 51a to two transversal ends of the plate 53a. In storage position represented in FIG. 8a, the offset arm and the plate of each of the propulsion modules are held against the structure of the satellite, on the north and south faces. Thus configured, the propulsion system has a limited bulk. The four thrusters are oriented in such a way that, in the storage position, their thrust axis is parallel to the axis Z. The storage position is therefore suited to the orbit transfer without requiring any prior displacement of the propulsion module by means of the motorized link. In operational position represented in FIG. 8b, the propulsion module is oriented in such a way that the force resulting from the simultaneous firing of the two main thrusters (or of the two redundant thrusters) does not exert any torque about the centre of mass of the satellite. The propulsion system represented in FIGS. 8a and 8b is particularly advantageous. The propulsion modules, comprising a motorized link relatively distant from the plate on the axis Z, or, in other words, an offset arm of relatively long length on Z, make it possible, in operational position, to deliver a thrust that has a strong component on Y. Typically, it is envisaged that the motorized link 51a will be positioned in proximity to the middle of the north face on the axis Z.

In the design phase, the stresses imposed by the other components of the satellite have to be taken into account. As an example, a propulsion module that is too bulky, or positioned too close to the solar generators, is likely to reduce the effectiveness of the solar generators by shading, during the orbit transfer or during station-keeping. Furthermore, the firing of the thrusters may result in erosion or contamination of the equipment (antenna reflectors, solar generators) if they are positioned too close to such equipment.

The invention relates also to a satellite in Earth orbit provided with a propulsion system having the features previously described.

The invention relates also to a method for controlling the inclination of a satellite in geostationary orbit comprising a propulsion system having the features previously described, and comprising steps consisting in:
displacing a first propulsion module, by means of its motorized link, in such a way that the plane containing the thrust axes of its two thrusters passes in proximity to the centre of mass CM of the satellite,
simultaneously activating the two thrusters of said first module in proximity to a first orbital node,
displacing the second opposite propulsion module, by means of its motorized link, in such a way that the plane containing the thrust axes of its two thrusters passes in proximity to the centre of mass of the satellite,
simultaneously activating the two thrusters of said second module in proximity to a second orbital node, opposite the first orbital node.

The invention relates also a method for transferring the orbit of a satellite comprising a propulsion system having the features previously described, and comprising steps consisting in:
for each of the two propulsion modules, orienting the thrusters, by means of the motorized link, in such a way that the plane containing the thrust axes of the thrusters is parallel to the plane of the orbit,
simultaneously activating the thrusters of the two propulsion modules.

The invention relates also to a method for controlling the kinetic moment of a satellite comprising a kinetic moment accumulation device and a propulsion system according to one of claims 1 to 8, characterized in that it comprises steps consisting in:
orienting the thrusters (54a, 54b) of the two propulsion modules (50a, 50b) of at least one propulsion assembly (100) by means of their motorized link (51a) in one and the same angular position,
simultaneously activating the two duly oriented thrusters (54a, 54b), so as to generate, on the satellite, a torque about the axis V.

The invention relates also to a method for controlling the kinetic moment of a satellite comprising a kinetic moment accumulation device and a propulsion system having the features previously described, and comprising steps consisting in:
orienting the thrusters of at least one propulsion module by means of the motorized link of said module,
activating the two thrusters of said module differentially, in intensity or in duration, so as to generate a torque on the satellite,
the duly generated torque about the axis at right angles to both the axis V and the two thrust axes of the two thrusters being able to limit or reduce the kinetic moment absorbed by the kinetic moment accumulation device of the satellite.

The invention relates also a method for controlling the kinetic moment of a satellite comprising a kinetic moment accumulation device and a propulsion system according to one of claims 1 to 7, characterized in that it comprises steps consisting in:
orienting the thrusters (54a, 55a) of at least one propulsion module (50a) by means of the motorized link (51a) and/or (70a) of said propulsion module (50a),
activating the two thrusters (54a, 55a) of said propulsion module (50a) differentially, in intensity or in duration, so as to generate, on the satellite (10), a torque about the axis at right angles to both the axis V and the two thrust axes of the two thrusters (54a, 55a),
the duly generated torque limiting or reducing the kinetic moment absorbed by the kinetic moment accumulation device of the satellite (10), and the force on the axis X contributing to controlling the movement of the satellite in the plane of its orbit.

The invention claimed is:

1. A propulsion system for the orbit control of a satellite in Earth orbit driven at a rate of displacement along an axis V tangential to the orbit, comprising two propulsion modules, fixed to the satellite, and facing one another relative to the plane of the orbit, each of the propulsion modules comprising, in succession:
   a motorized rotation link rotatable about an axis parallel to the axis V,
   an offset arm, and
   a plate supporting two thrusters, each of the two thrusters being suitable for delivering a thrust on an axis, the two thrusters being arranged on the plate on either side of a plane P at right angles to the axis V and passing through a centre of mass of the satellite; each of the two thrusters being oriented in such a way that the thrust axes of the two thrusters are parallel to one another and at right angles to the axis V.

2. The propulsion system according to claim 1, wherein the two thrusters of each of the propulsion modules are arranged on the plate substantially at equal distances from the plane P.

3. The propulsion system according to claim 1, wherein each of the two thrusters of each of the two propulsion modules is associated with a redundant thruster arranged on the plate in proximity to said thruster, and in such a way that its thrust axis is contained in a plane parallel to the plane P and containing the thrust axis of said thruster.

4. The propulsion system according to claim 1, wherein each of the two thrusters of each of the two propulsion modules is associated with a redundant thruster arranged on the plate in proximity to said thruster, and in such a way that its thrust axis is contained in a plane containing the thrust axes of the two thrusters.

5. The propulsion system according to claim 1, wherein the motorized link linking the offset arm to the satellite, the plate being linked to the offset arm in order to be driven in rotation about said rotation axis by said offset arm and the motorized link of each of the two propulsion modules allows the rotation of the plate between:
   a storage position, suitable for the launching of the satellite; the offset arm of said propulsion module being held against the satellite, and
   an operational position, configured in such a way that the plane containing the thrust axes of the two thrusters of said propulsion module passes in proximity to the centre of mass CM of the satellite.

6. The propulsion system according to claim 1, wherein each of the two propulsion modules also comprises, between the offset arm and the plate of said propulsion module, a second motorized rotation link about an axis T at right angles to both the axis V and the thrust axes of the two thrusters of said propulsion module.

7. The propulsion system according to claim 6, wherein each of the two propulsion modules further comprises, between the second motorized link and the plate, a second offset arm.

8. The propulsion system according to claim 6, wherein each offset arm provides an only offset arm of respective propulsion module.

9. A satellite in Earth orbit provided with a propulsion system according to claim 1.

10. An inclination control method for a satellite in geostationary orbit comprising a propulsion system according to claim 1, comprising:
    displacing a first of the two propulsion modules, by means of its motorized link, in such a way that the plane containing the thrust axes of its two thrusters passes in proximity to the centre of mass CM of the satellite,
    simultaneously activating the two thrusters of said first propulsion module in proximity to a first orbital node,
    displacing the second of the two propulsion modules, by means of its motorized link, in such a way that the plane containing the thrust axes of its two thrusters passes in proximity to the centre of mass CM of the satellite,
    simultaneously activating the two thrusters of said second propulsion module in proximity to a second orbital node, opposite the first orbital node.

11. An orbit transfer method for a satellite comprising a propulsion system according to claim 1, comprising:
    for each of the two propulsion modules, orienting the thrusters, by means of the motorized link, in such a way that the plane containing the thrust axes of the thrusters is parallel to the plane of the orbit,
    simultaneously activating the thrusters of the two propulsion modules.

12. A method for controlling the kinetic moment of a satellite comprising a kinetic moment accumulation device and a propulsion system according to claim 1, comprising:
    orienting the thrusters of the two propulsion modules by means of their motorized link in one and the same angular position,
    simultaneously activating the two duly oriented thrusters, so as to generate, on the satellite, a torque about the axis V.

13. A method for controlling the kinetic moment of a satellite comprising a kinetic moment accumulation device and a propulsion system according to claim 1, comprising:
    orienting the thrusters of at least one of the propulsion modules by means of the motorized link of said at least one propulsion module,
    activating the two thrusters of said at least one propulsion module differentially, in intensity or in duration, so as to generate, on the satellite, a torque about the axis at right angles to both the axis V and the two thrust axes of the two thrusters,
    the duly generated torque limiting or reducing the kinetic moment absorbed by the kinetic moment accumulation device of the satellite.

14. A method for controlling the kinetic moment of a satellite comprising a kinetic moment accumulation device and a propulsion system according to claim 1, comprising:
    orienting the thrusters of at least one of the propulsion modules by means of the motorized link,
    activating the two thrusters of said at least one propulsion module differentially, in intensity or in duration, so as to generate, on the satellite, a torque about the axis at right angles to both the axis V and the two thrust axes of the two thrusters, the duly generated torque limiting or reducing the kinetic moment absorbed by the kinetic moment accumulation device of the satellite, and the duly generated force on the axis X contributing to controlling the movement of the satellite in the plane of its orbit.

15. The propulsion system according to claim 1, wherein each thruster of the two thrusters of each of the two propulsion modules is associated with a redundant thruster arranged on the plate in proximity to said thruster.

16. The propulsion system according to claim 1, wherein each motorized rotation link provides an only motorized link of respective propulsion module.

\* \* \* \* \*